Sept. 15, 1936. H. EDGERTON 2,054,560
FLOAT CONTROLLED VALVE MECHANISM
Filed Dec. 21, 1932
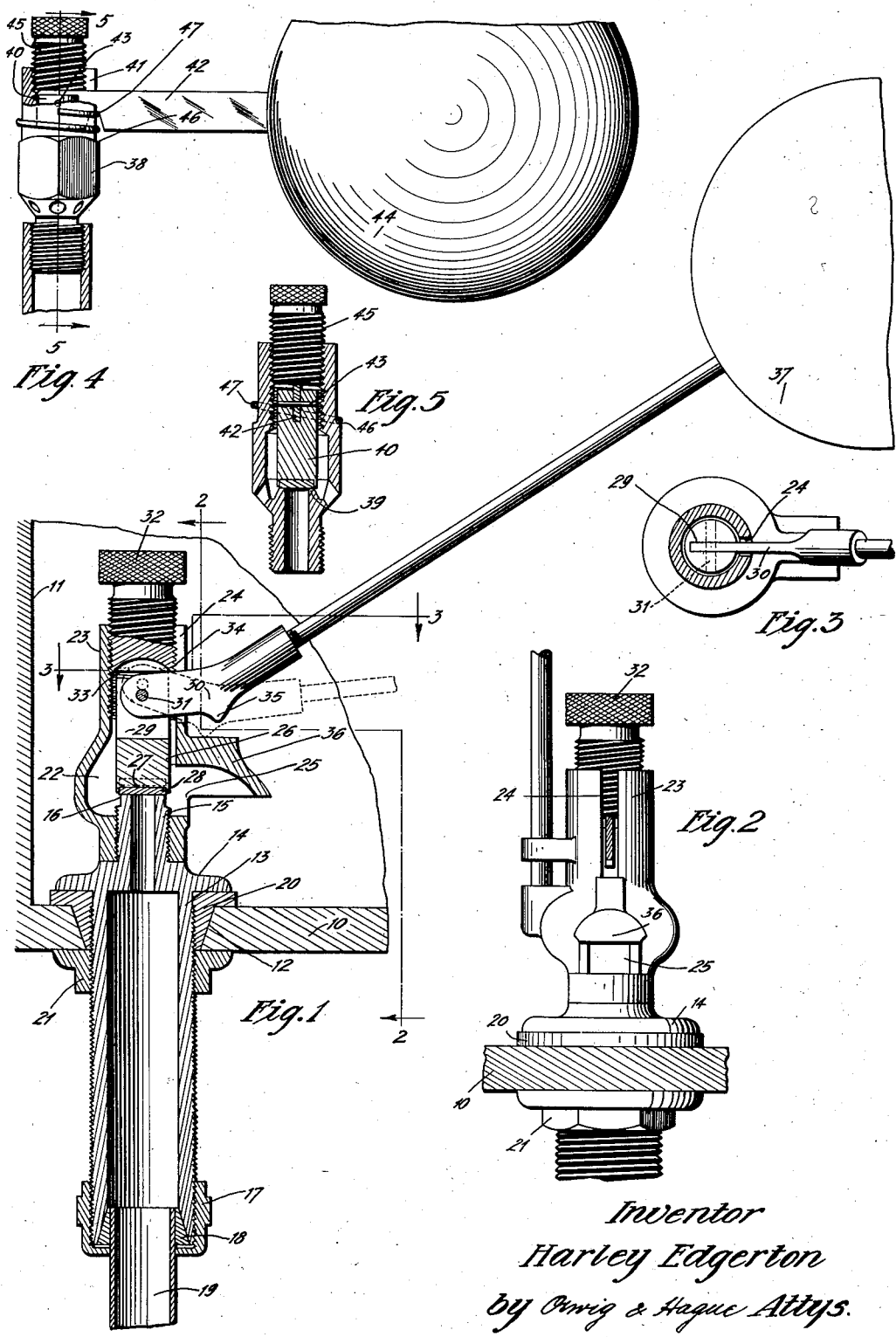
Inventor
Harley Edgerton
by Orwig & Hague Attys.

Patented Sept. 15, 1936

2,054,560

UNITED STATES PATENT OFFICE 2,054,560

FLOAT CONTROLLED VALVE MECHANISM

Harley Edgerton, Boone, Iowa, assignor to Quinn Wire & Iron Works, Boone, Iowa, a corporation of Iowa Application December 21, 1932, Serial No. 648,260

2 Claims. (Cl. 137—104)

The object of my invention is to provide a simple, durable and inexpensive valve mechanism of that type adapted to be actuated and controlled by a float, which may be easily and quickly placed in a water tank, and when so placed will be quiet and positive in its operation.

A further object is to provide in a valve construction, employing a float controlled valve, means so arranged and constructed that the valve and its operating means may be easily and quickly removed and replaced when so desired, without disconnecting from the tank the valve body or molesting the connections between said body and the supply pipes.

A further object is to provide in a valve mechanism improved means which may be easily operated to adjust the mechanism whereby any one of a number of different water levels may be maintained in a tank or container in which the valve is mounted.

A further object is to provide in a valve mechanism of the type above described, means whereby the valve is particularly adapted to be used in low pressure systems.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a vertical sectional view of my improved valve body showing the manner in which the same is mounted in a tank.

Figure 2 is a sectional view taken on the line 2—2 of Figure 1.

Figure 3 is an enlarged detail sectional view taken on the line 3—3 of Figure 1.

Figure 4 illustrates a slightly modified form of my improved valve construction, which is particularly adapted to be used in low pressure systems.

Figure 5 is a sectional view taken on the line 5—5 of Figure 4.

Referring to the accompanying drawing, I have used the reference numeral 10 to indicate the bottom of a water tank, having side members 11. The bottom 10 is provided with an opening 12 through which the body of a valve mechanism may be inserted.

My improved valve mechanism comprises a body portion 13 having its outer surface screw threaded, and its upper end provided with a flange 14. The upper end is also provided with an upwardly extending screw threaded portion 15, the upper end of which terminates in a valve seat 16. The body 13 is formed hollow and provided at its lower end with a screw threaded collar 17 designed to support a packing 18 surrounding a supply pipe 19. The parts 17, 18 and 19 are of the ordinary construction and form no part of my present invention.

The body 10 is provided with a tapered washer 20 designed to enter the opening 12 and also with a lock nut 21 for rigidly securing the body in the tank bottom. The body 13 and the member 15 provide means which may be attached to the tank, and which does not need to be removed when the valve casing is removed for repairs.

Mounted on the screw threaded portion 15 I have provided a valve casing 22 having its lower end enlarged and formed hollow, terminating in an upwardly extending cylindrical portion 23 internally screw threaded, and also provided with a longitudinal slot 24. The lower end of the casing 22 has an outlet opening 25. The upper end of the member 15 projects upwardly within the casing 22 a slight distance in the manner illustrated in Figure 1, and designed to support a valve 26 which is preferably of cylindrical formation and slidably mounted within the upwardly extending portion 23. The lower end of the valve 26 has a recess 27 in which is inserted a gasket 28 to form a valve seat.

The upper end of the member 26 is provided with the transverse slot 29 in which the inner end of a lever 30 is supported by means of a pivot 31. A plug 32 is adjustably mounted in the upper end of the sleeve 23. The lower end of the plug 32 has a concave recess 33 to form an annular flange 34 on the lower end of said plug designed to provide a fulcrum against which the upper edge of the lever 30 may operate as its free end is elevated to cause the valve member 27 to be moved downwardly against the seat 16.

The lever 30 is provided with a downwardly extending lug 35 designed to engage the upper surface of a laterally extending lug 36 carried by the lower end of the body portion. The lug 35 is designed to engage the lug 36 when the outer end of the lever 33 is lowered. The member 36 acts as a fulcrum for said lever, whereby the valve 26 may be elevated and caused to disengage its seat at such times when the tank is partially or entirely empty. The outer end of the lever 30 is provided with a float 37 by means of which the lever may be actuated.

The operation of the preferred form of my improved mechanism is as follows:

Assuming that the tank is filled with water, and that the valve mechanism is in the position illustrated in Figure 1, and that water is drawn from the tank, then the float 37 will lower, permitting the valve 26 to be elevated by water pressure. As the float 37 is further lowered, the member 35 will engage the fulcrum member 36 and the lever 30 assume the dotted line position supporting the valve in an elevated position to permit water to flow freely into said tank with comparatively little noise. Water will then again enter the tank causing the float 37 to rise, and with it the free end of the lever 30 until the upper edge of said lever engages the fulcrum member 34, at which time further upward movement of the float 37 will force the valve 26 to a closed position against water pressure.

In this connection it will be noted that the fulcrum member 34 is closer to the pivot 31 than the fulcrum member 35, so that a considerable leverage is imparted to the valve as it is moved to closed position.

It sometimes happens that when the tank is being emptied, the valve 26 has some tendency to stick to its seat when used in connection with low pressure systems. In such cases, the float 37 will lower until the member 35 engages the member 36, after which said members will act as a fulcrum, whereby the weight of the float 37 will cause the valve 26 to be lifted and disengaged from its seat. The member 35 is placed a considerable distance from the pivot 31, so that the valve 26 may be lifted quite rapidly to prevent unnecessary whistling noise as the water flows into the tank.

The normal water level in the tank may be varied by adjusting the plug 32. By moving the plug outwardly, a higher water level may be obtained, while moving the plug inwardly will cause the valve to close and lower the water level. Thus means is provided whereby the valve may be easily and quickly adjusted to operate at predetermined water levels.

A further advantage of my improved construction lies in the fact that by removing the plug 32, the valve 26 and the lever 30 may be easily and quickly detached by simply lifting the valve out of the casing, after which any necessary repairs may be made and the valve easily and quickly replaced.

Furthermore the casing 22 may be removed from the body 13 if so desired without interfering with the pipe connections to the tank, by simply unscrewing the said body from the member 15. This also provides means whereby the body 13 may be installed with the casing removed, after which the casing may be placed in position and properly alined, after which the valve 26 and the lever 30 may then be applied.

This is of considerable advantage when the valve is installed in flush tanks, inasmuch as these tanks are usually provided with other valve mechanism for discharging the tank and of comparatively narrow construction, so that a very small amount of room is available for the use of tools with which to install the valves. This is of particular advantage when making repairs, after which the tank and supply pipes have been installed.

In Figures 4 and 5 I have illustrated a slightly modified form of my valve which is particularly adapted to be used in low pressure systems such as stock watering troughs used in connection with larger supply tanks.

My modified valve comprises a casing 38 having a valve seat 39 in its lower end similar to the seat 16, and a valve 40 similar to the valve 26. The casing 38 is provided with a slot 41 in which is mounted a short lever 42, one end of which is pivotally connected to the valve 40 by means of a pin 43. The outer end of the lever is provided with a float 44. A plug 45 is provided similar to the plug 32 and for the same purpose.

The upper end of the casing 38 is formed somewhat contracted to form a shoulder 46 on which is supported a spring 47 designed to support the lower edge of the lever 42 in the manner clearly illustrated in Figure 4. The spring 47 holds the inner end of the lever 42 against the fulcrum 45 as said fulcrum is elevated or lowered to adjust the float. Otherwise the weight of the valve and the inner end of the lever might be sufficient to overcome the water pressure until the float 44 has reached its lower limit of movement.

In watering troughs and the like it is desirable to maintain as nearly as possible an even water level. For that reason it is desirable that the valve 40 be opened as soon as the float 44 starts to lower, whereby the water level will again be reestablished immediately after the removal of part of the water.

Thus it will be seen that I have provided a simple, durable and inexpensive valve construction which may be utilized for either flush tanks used in high pressure systems or in connection with watering troughs using a low pressure system, and at the same time provided a valve which may be easily and quickly adjusted and taken apart for repairs and assembled.

I claim as my invention:

1. A valve mechanism comprising a body member having inlet and outlet passages, a valve seat for the inlet passage, a valve for said seat, a float lever, a float for said lever, and means for pivotally conecting said lever to said valve, the body and lever including a pair of fulcrum devices arranged at different distances from the pivotal connection between the valve and said lever to cause the valve to be closed as the float is moved to its upper position of movement and when the lever engages one of said fulcrum devices, and to be moved to an open position as the lever engages the other fulcrum device, and whereby less movement will be imparted to the valve as the valve is moved to a closed position and a greater movement imparted to said valve as it is moved to an open position, as compared to a given amount of movement of said float.

2. A valve mechanism comprising a body member having a longitudinal opening and one end internally screw threaded and provided with a slot, the other end of said body being provided with inlet and outlet passages and a valve seat for said inlet passage, a valve slidably mounted in said opening, a lever having one end projected through said slot and pivotally connected to said valve, a float on the free end of said lever, a plug mounted in the screw threaded portion of said body having its inner end provided with a recess whereby the lower peripheral edge of said plug will provide a fulcrum for said lever as the float is moved to position to close the valve, said body having an external laterally projecting shoulder, said lever having a fulcrum member to engage said shoulder at a point a greater distance from the pivotal connection between said valve and said lever than the distance between said pivotal connection and the first fulcrum member as the float is lowered, whereby a less amount of movement will be imparted to said valve as the float is elevated and a greater amount of movement imparted to said valve as the float is moved to a position near its lower limit of movement, as compared to a given amount of movement of said float.

HARLEY EDGERTON.